United States Patent Office

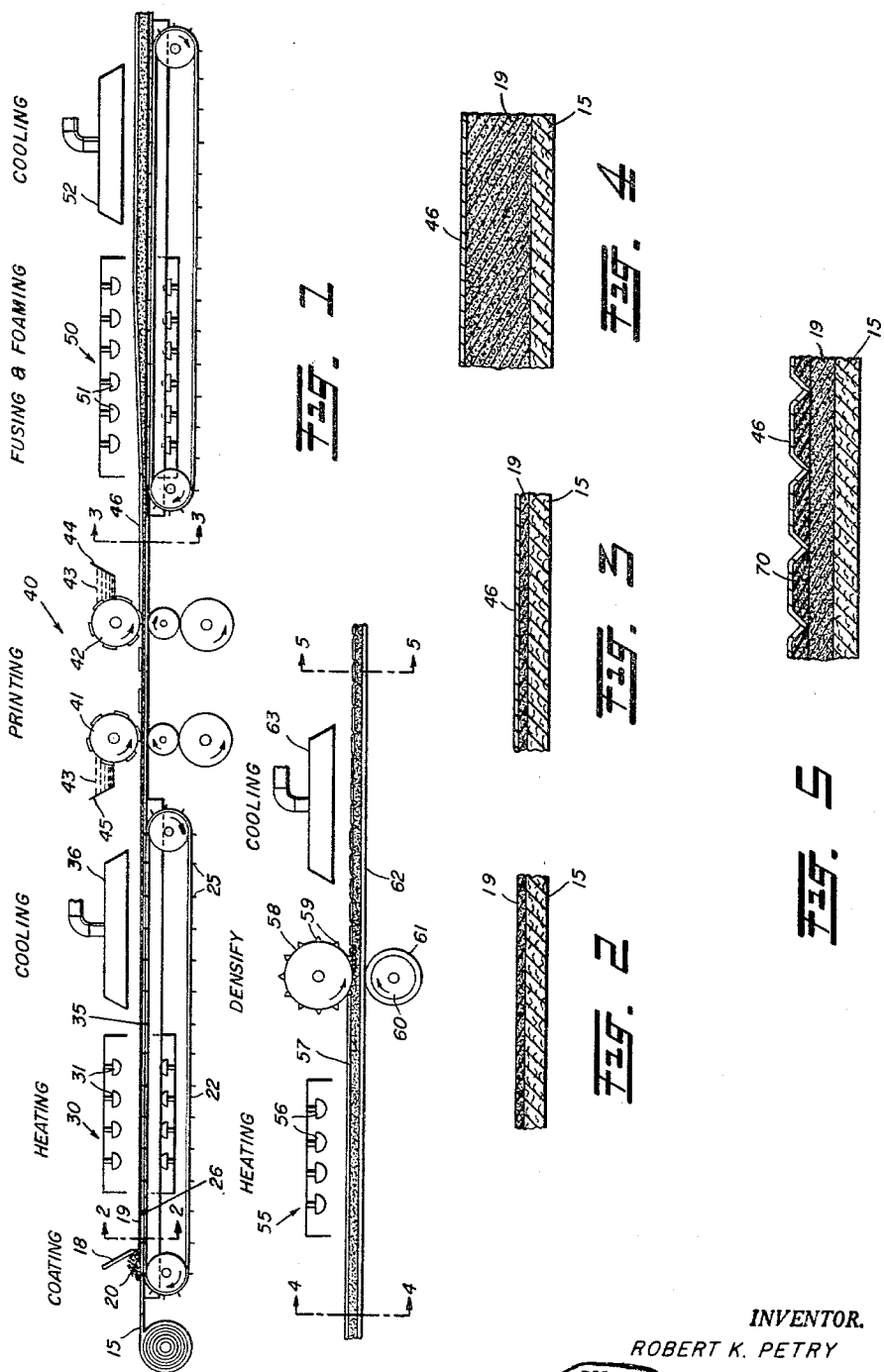

3,196,030
Patented July 20, 1965

3,196,030
DECORATIVE FOAM SURFACE COVERING
AND PROCESS THEREFOR
Robert K. Petry, Mountain Lakes, N.J., assignor to
Congoleum-Nairn Inc., Kearny, N.J., a corporation of
New York
Filed Dec. 29, 1961, Ser. No. 163,319
14 Claims. (Cl. 117—10)

This invention relates to flexible decorative surface coverings and particularly to a method for producing a textured foam surface covering.

Printed products adaptable as decorative and protective coverings for floors, walls and the like have been available for many years. The technique of printing an oleoresinous enamel paint decoration upon a flexible backing sheet has been used commercially for at least 40 years to produce products commonly referred to as printed felt base. Such products have the desirable features of being low in cost and they can be readily manufactured in a variety of attractive designs. Printed felt base has a hard and smooth decorative wearing surface. Although this renders the product easily cleaned, the hard surface tends to be cold to the touch and is limited in design as to what can be printed. Also, the hard surface reflects sounds and causes a small room to be unduly noisy. Printed felt base is somewhat better in insulating properties due to the felt backing, but since the felt layer is very thin and on the back of the product, the improvement is only slight.

Resilient floor coverings are available which are quiet and comfortable under foot by utilizing the resilient properties of a material such as rubber. Rubber floor tile is relatively quiet and comfortable under foot. The product, however, is expensive and also tends to be cool in winter due to its high thermal conductivity.

Products with improved resilience and reduced conductivity of heat can be made by the application of a thin layer of foam rubber to the back of a surface covering. Although this does improve products such as printed felt base, there are certain disadvantages. One of the major disadvantages is that the foam rubber layer is subject to deterioration and chemical attack, particularly if the product is installed upon a concrete floor or wall. In addition, the foam layer must be formed separately and then laminated to the back of the flooring material.

United States Patent 2,943,949 which issued to Robert K. Petry on July 5, 1960, discloses a surface covering product utilizing a foam layer. In accordance with this patent, a foam product is produced having a textured or three-dimensional surface. The product is made by embossing or otherwise deforming a base such as felt in a suitable overall design. The surface of the embossed felt is coated with a resinous composition containing a blowing agent to form a smooth layer. The coated product is thereafter subject to heat to decompose the blowing agent and convert the resinous layer to a fused and foamed structure. Embossings in the surface of the felt are mirror-imaged in the surface of the product. This result is caused by the greater thickness of foamable composition present in the layer above a depressed area as compared with the thickness of the layer in the undepressed areas. A variation of this product is disclosed in United States Patent 2,961,332 which issued to R. Frank Nairn on November 22, 1960. In accordance with this Letters Patent, a foam structure product is produced by utilizing different amounts of blowing agent in various sections of a resinous coating. After decomposition of the blowing agent, the product has an irregular surface created by the various heights of foam. A product closely resembling a sculptured carpet can be obtained in this fashion. The products of these patents make excellent surface coverings. These products can be made particularly long-wearing by applying a solid composition coating to their surface. The coating is applied so as to prevent the loss of the textured surface of the product. One method of accomplishing this is by spraying the coating on the surface. Such an operation, however, limits the thickness of the coating which can be obtained and, therefore, the service life of the product.

OBJECTS OF THE INVENTION

It is an object of the invention to produce an improved decorative surface covering having a foam layer in varying and controlled density. Another object of the invention is to produce a surface covering having a foam structure and a wear resistant surface layer. Another object of the invention is to produce such a product characterized by high resistance to thermal conductivity. A further object is to provide a process for producing surface coverings having a foam layer of varying and controlled density. A still further object of the invention is to provide a process for producing such a surface covering in a wide range of decorative effects. Other objects and the advantages of the invention will appear hereinafter.

THE GENERAL INVENTION

In accordance with the invention, a foam structure surface covering is produced by coating a base with a resinous composition containing a blowing agent, heating the coating to fuse the composition and decompose the blowing agent thereby producing a foam layer, cooling a portion of the foam layer to set the foam, passing the foam layer through rotating rolls to reduce the thickness of the foam layer which at least partially collapses the foam structure and thereafter cooling the product. As an alternative, one of the rotating rolls can have a suitable design embossed in its surface which is transferred into the surface of the foam.

The finished product can take several forms. If one surface of the foam layer is heated and the remainder is kept relatively cool, the heated surface of foam layer is collapsed causing the foam to be covered completely by a thin, solid wear layer on the heated surface. This procedure provides a simple method for producing a foam product having a substantially thick wear resistant surface layer and can be used to apply such a layer to one or both surfaces of the foam. In addition, it allows the controlling of the density of the foam since the pressure exerted on the surface of the product in combination with the temperature of the interior of the foam layer can control the density of the foam. Using this procedure, dense foams can be obtained. If it is desired to produce a foam layer having improved tensile strength, a relatively dense layer can be produced in the center of the foam layer. This is accomplished by cooling the surfaces of the foam layer while the center of the foam is heated. The passing of the foam sheet through the rolls causes the interior of the foam to collapse whereby a dense, intermediate layer is produced. In this manner, a foam layer can be produced having foam on one or both sides of the layer with a denser wear layer caused by the collapsed foam. The resulting sheet has greatly increased tensile strength as compared to a conventional foam layer. If the alternate embossing procedure is used, an embossed design is in the surface of the foam layer.

DETAILED DESCRIPTION OF INVENTION

The invention will be better understood from the following detailed description of one embodiment of the invention when read in connection with the drawings wherein FIGURE 1 is a schematic representation of one method of producing a surface covering in accordance with the invention; and FIGURES 2 to 4 are enlarged cross-sectional views of the product in various stages of manufacture as shown in FIGURE 1.

FIGURE 5 is an enlarged cross-sectional view of the finished product having depressed areas in its surface.

A base, such as felt 15, is placed on a conveyor, as for example, an endless belt 22, provided with pins 25 which project vertically from the belt at spaced points along its edges. The base 15 is engaged by the pin 25 which advance it through the various stages of the process. A coat 19 of resinous composition containing a blowing agent 20 is applied to the upper surface of the base 15 by any suitable means such as a doctor blade 18, a reverse roll coater, or similar coating apparatus. If a doctor blade 18 is used, a reservoir of the resinous composition 20 is maintained behind the blade allowing a uniform coating of the composition to be applied to the surface of the felt. The coated base 26 is then passed through a heating unit generally indicated at 30 which can be any conventional heating means such as a bank of infrared heating lamps 31. The heating unit supplies sufficient heat to at least partially gel the thermoplastic resinous coating. The gelled coating 35 is then cooled by passing through a cooling chamber 36. The cooled sheet passes to a printing unit generally indicated at 40 which can be any of the conventional printing means such as a flat bed printing machine as widely used in the smooth surface flooring industry or a conventional gravure press having printing cylinders 41 and 42 which are etched to print a design with a suitable ink 43 on the surface of the gelled sheet. The cylinders pick up printing ink composition from ink supplies 44 and 45 on its etched surface and applies the printing composition on the surface of the gelled layer 35. The printing composition is conventionally dried in the printing press. The printed sheet 46 is then passed through a heating unit 50 which can be any type of heating unit such as a bank of infrared heat lamps 51. The sheet is heated to a temperature sufficient to fuse the composition and decompose the blowing agent thereby converting the coating to a foam layer.

The foam product can then be cooled by passing through a cooling unit generally indicated at 52. The cooling sets the film by bringing it to below the fusion temperature of the composition. The cooled sheet then passes to a heating unit generally indicated at 55 which can be a bank of infrared heat lamps 56. The heat is only applied to the surface to raise its temperature. This heating is carefully controlled so that it only extends to the depth desired in the foam layer. The heated foam layer 57 is then passed between the nip of rotating rolls which comprise an upper hard surfaced roll 58. The roll 58 can also be embossed with a suitable design so that it bears a plurality of spaced protuberances 59 which are provided in the pattern to be transferred into the foam. The back of the composite sheet is contacted by a back-up roll 60 which forces the composite product against the hard surfaced roll. The back-up roll can be a steel roll or have a resilient rubber cover 61. After passing through the rolls, the sheet 62 is cooled by passing through a cooling chamber 63 and then withdrawn from the apparatus. The product can be used in sheet form as produced or cut into tiles or other appropriate shapes for use.

In one of the alternate methods, one or both surfaces of the foam layers are allowed to cool while the center of the foam remains heated. The passing of the sheet through the rolls cased the heated center of the sheet to collapse and form a solid section in the middle of the foam. As another alternative, the foamable layer can be applied by printing, utilizing a block printing machine or the like. In this manner, the coating is made up of a series of different colored compositions in the form of a design. This procedure would eliminate the first heating step and subsequent printing.

BACKING SHEET

The backing can either be removed or remain a part of the finished product. Suitable backing sheets which can be removed include those formed of a paper coated on one surface with release agents such as the silicons which are particularly suitable. Agents such as those disclosed in United States Patent 2,273,040 issued February 17, 1942, are also suitable for coating material to reduce adhesion. Additionally, a polished metal belt can be used. If the backing is to remain, flexible resinous compositions as well as sheets of woven fabric and impregnated felted fibers can be used. Any of the thermoplastic or elastomer resinous compositions which can be calendered or pressed to form a flexible sheet can be used to form backing sheets. Typical of the resins which can be compounded with plasticizers and fillers and sheeted to form a flexible sheet are such resins as butadiene-styrene copolymers, polymerized chloroprene, polyvinyl chloride, polyvinyl acetate, vinyl chloride-vinyl acetate copolymers and the like. In some cases, scrap and degraded resinous compositions can be salvaged by forming them into sheets which can be used as backing sheets in producing products in accordance with the invention.

Suitable backing sheets also include woven fabrics formed of such fibers as cotton, wool, asbestos and various synthetic fibers. Where loosely woven fabrics such as burlap are used, the fabric can be sized to prevent passage of the coating composition through the openings between the fibers by utilizing the conventional sizing compositions used in the textile industry.

Felted cellulose or mineral fibrous sheets impregnated with a waterproofing and strengthening saturant are particularly useful in accordince with the invention since they are low in cost and yet are flexible and strong. The sources of cellulose can include cotton or other rags, wood pulp, paper boxes, or mixtures thereof in any proportion. Asbestos is the most commonly used mineral fiber. In addition to the fibers, fillers such as wood flour can be used. A slurry of fibrous material in water is formed into a sheet using any of the techniques conventionally employed in the manufacture of paper. For example, sheet formulation can take place on a Fourdrinier or cylinder sheet-forming machine. The fibrous sheet so prepared is then dried. In addition to cellulose and mineral fibers, other fibers can be used including synthetic fibers and those of animal origin.

Felted fibrous sheets as produced by conventional sheet forming techniques are usually unsatisfactory for use as backings for surface covering products without impregnation with a waterproofing and strengthening impregnant, due to poor strength and water resistance, if they are to remain as a permanent backing.

The particular impregnant chosen must not only be capable of imparting strength and water resistance to the sheet, but must also meet other requirements as to its physical and chemical behavior at high temperatures. The coating compositions applied to the backing in accordance with the invention must be heated to temperatures as high as 300° F. to 400° F. in order to fuse the resin and/or expand the composition into a foam. Thus, the impregnant chosen must be stable at these temperatures. The impregnant should be substantially free of any components which are volatile at these temperatures and it also must not soften to such an extent as to exude from the sheet. In addition, the impregnant should not be subject to appreciable detrimental chemical changes such as oxidation.

Suitable impregnants include vinyl resins, such as polymers of vinyl chloride and vinyl acetate. Particularly suitable are copolymers of vinyl acetate and vinyl chloride or these monomers copolymerized with other monomers copolymerizable therewith. In addition, polymerized acrylic and methacrylic acids and their polymerized derivatives, polyethylene, polystyrene, butadiene-styrene copolymer, butadiene-acrylonitrile copolymer, natural rubber, polymerized chloroprene and the like are suitable. Thermosetting resins, which under the influence of heat cure by polymerizing and cross-linking with the cellulose can also be used as impregnants. Such resins as phenolic resins, polyesters, oleoresins such as drying oils and the like, isocyanates and polyurethanes and the like, are also useful.

These resins can be incorporated into the felted fibrous sheet by impregnation of the sheet with an emulsion or solution of the resin followed by drying of the sheet to remove the solvent. Alternately, the resin can be added in fine particles to the fiber furnish prior to sheet formation either as solid particles of resin or as an emulsion in water or other emulsifying vehicle. The base can be embossed with a suitable design, if desired, in the nature of the product produced in United States Patent 2,943,-949 which issued to Robert K. Petry on July 5, 1960.

COATING COMPOSITIONS

In accordance with the invention, a layer of foamable composition is coated, printed, or otherwise applied to the base. The resinous binder must be one that is coalesced or fused into a continuous film by the application of heat. The dispersion medium can be water, in the case of an aqueous latex, or an organic solvent, but is preferably a fluid plasticizer for the resin used. Such a dispersion of resin in a plasticizer is conventionally termed a plastisol. A plastisol has appreciable fluidity at normal room temperature but is converted by heat into a flexible, tough thermoplastic mass. This ultimate result is brought about by the process of fusion wherein the resin becomes plasticized and completely solvated by the plasticizer. Plastisols are preferred since it is unnecessary to remove the carrier as is necessary with water and organic solvent carriers.

The preferred and most widely used resins for surface coverings are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than 40 percent of the extraneous co-monomer is copolymerized therein. Suitable extraneous co-monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like. Instead of the single unsaturated co-monomers of the types above indicated, mixtures of such co-monomers may enter into the copolymers, it being understood that the total quantity thereof shall be small enough that the essential character of the polyvinyl chloride chain is retained. Although such vinyl chloride resins are preferred, as is apparent, the coating composition can be formed from any resin which can be fused and foamed and the invention is not intended to be limited to any particular resin or group since many other types and groups of resins will occur to those skilled in the art.

Resins adaptable for use in formulating vinyl plastisols are commonly referred to as dispersion grade resins. Such resins are available having particle sizes of from 0.02 to about 2 microns in contrast to calender grade vinyl resins which are available in particles ranging up to 35 microns in size. Dispersion grade resins are usually of higher molecular weight than calender grade resins and have particle surfaces of a hard, horny nature.

Polymers of vinyl chloride having specific viscosities above about 0.17 and preferably between 0.017 and 0.31 as measured in a solution of 0.2 gram of resin in 100 milliliters of nitrobenzene at 20° C. are particularly effective. In the determination of specific viscosities, the sample of resin in nitrobenzene solution maintained at a temperature of 20° C. is allowed to flow between two calibrated marks in a pipette and time required is recorded. This time is compared with the time required for a control of pure nitrobenzene solvent to pass between the same two marks, also at a temperature of 20° C. The specific viscosity is determined as the sample flow time divided by the control flow time, minus 1. The specific viscosity is an effective measure of relative molecular weight of the polymer, the higher the specific viscosity the higher being the molecular weight. The intrinsic viscosity is another method for determining molecular weight. Resins are preferred which have an intrinsic viscosity of from about 0.75 to about 1.3. The intrinsic viscosity is obtained from viscosity measurements, at 30° C. of cyclohexanone solution of the resin and of cyclohexanone solvent. The intrinsic viscosity $[\eta]$ is defined by the equation $$[\eta] = C \lim_{\longrightarrow} 0\left(\frac{\ln \eta \text{ rel.}}{C}\right)$$

when $\eta$ rel. is relative viscosity and C is the concentration of polymer in grams per 100 cc., the concentration being such that $\eta$ rel. has a value of from 1.15 to 1.4.

In the formulation of plastisol compositions for use in the invention, the fine particle size resin is uniformly dispersed in a mass of fluid plasticizer. The fluidity of plastisols is influenced in part by the particular resin selected but is also a function of the ratio of plasticizer to resin. Plastisols become less fluid as the ratio of plasticizer to resin is reduced. Plastisol coating compositions for use in the invention contain from about 50 to about 150 parts plasticizer per 100 parts resin with a range of about 60 to about 100 parts plasticizer per 100 parts resin being particularly effective. The viscosity of plastisol compositions can also be reduced by the addition of small amounts of a volatile diluent not exceeding about 100 parts per 100 parts resin. Useful diluents include benzene, toluene, methyl ethyl ketone, petroleum solvents such as V.M. and P. naphtha (Boiling Range of 190°–275° F.) and the like. If the compositions are to be applied by a printing step, it is usually necessary to reduce their viscosity. Suitable printing compositions have a viscosity of 25° C. of from about 200 to about 25,000 centipoises as measured with a Brookfield viscometer using a No. 6 spindle at 10 r.p.m. For printing by the flat bed technique, a viscosity range of about 500 to about 5,000 centipoises is desirable with a range of about 1,000 to about 3,500 centipoises being particularly effective.

The selection of the plasticizer is important in determining the strength and flexibility of the coating and also in influencing the viscosity and viscosity stability of the printing fluid and the foaming characteristics of the composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate and the like. Plasticizers of the aromatic type, such as esters of aliphatic alcohols and aromatic acids or aromatic alcohols and aliphatic acids or aromatic alcohols and aromatic acids are desirble in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer or blend of plasticizers is chosen to yield a compositon of the desired viscosity and/or foaming characteristics. In addition, the plasticizer should preferably have a low vapor pressure at the temperatures required to fuse the resin. A vapor pressure of two millimeters of mercury or less at 400° F. is satisfactory.

Minor amounts of stabilizers are usually incorporated in the coating compositions to reduce the effects of degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium strontium and the like, glycerine, leucine, alanine, o- and p- amino benzoic and sulfanilic acids, hexamethylene tetramine, weak acid radicals including oleates, recinoleates, abietates, salicylyates and the like. Normally, the compositions contain about 0.5 to about 5 parts stabilizer per 100 parts resin.

The coating compositions can contain pigments in accordance with the particular color desired. Where a multicolored decorated effect is created in accordance with the invention by printing, separate batches of printing composition for each of the colors desired are needed. Any of the organic and inorganic pigments well know in the art for pigmenting compositions can be used. Normally, from about 0.5 to about 5 parts pigments per 100 parts resin are used.

The foamable compositions contain, in addition, an effective amount of blowing agent. The larger the amount of blowing agent within practical limits used, the greater is the expansion of the foam. Foam densities of from 10 percent to 50 percent of the density of the unblown composition can be readily attained. Such results are attainable with from about 1 to about 20 parts blowing agent per 100 parts resin with from about 2 to about 10 parts blowing agent per 100 parts resin being particularly effective for the production of foams of a density which are most desirable for use in producing surface coverings in accordance with the invention.

Complex organic compounds which when heated decompose to yield an inert gas and have residues which are compatible with the resin used in the compositions are preferred as blowing agents. Such materials have the property of decomposition over a narrow temperature range which is particularly desirable for obtaining a good foam structure. Compounds having the $>$N—N$<$ and —N=N— linkages decompose at elevated temperatures to yield an inert gas high in nitrogen. Typical compounds include substituted nitroso compounds, substituted hydrazides, substituted azo compounds and the like, such as are tabulated below:

| Blowing agent: | Decomposition temperature ° F. |
|---|---|
| Dinitrosopentamethylenetetramine | 355–375 |
| Azodicarbonamide | 370–390 |
| P,P'-oxybis-(benzenesulfonyl hydrazide) | 300–320 |
| N,N'-dimethyl-N,N'-dinitroso terephthalamide | 200–220 |

Blowing agents for use in the invention must be decomposed an effective amount at a temperature below the decomposition temperature of the resin used but above the elastomeric point of the resin composition. Therefore, in the case of compositions formulated with the preferred vinyl chloride polymers, a blowing agent decomposing between about 300 and about 450° F. should be used. The minimum initial decomposition temperature must be sufficiently high that no premature gas evolution occurs during mixing of the composition, coating operation, and the processing step. In the event the coating is to be fused before decomposition of the blowing agent, then it is necessary to use a blowing agent which decomposes above the fusion temperature of the resin.

When the technique of block printing is used to produce a decorative design which will also serve as the wear layer, a film of decorative composition of appreciable thickness is applied to the backing material. Printed films of 3 to 10 mils in thickness can be applied by block printing. When a film of this thickness is expanded and foamed by decomposition of the blowing agent in the composition, a decorative expanded foamed layer having an average thickness of 10 to 100 mils is produced. This is of sufficient thickness to provide satisfactory resilience and cushion effects when the product is installed as a floor covering. If the product is to be used as a wall covering, lower thicknesses of foam can be used.

FUSION OF COMPOSITION

After the first coating is applied, the coating is heated to gel the composition if it is desired to print a design on its surface. In this specification, the term "gel" includes both the partial (at least to the elastomeric point) and complete solvation of the resin or resins with the plasticizer. The heating is limited as to the time and temperature to prevent the decomposition of the blowing agent in the composition. When using the preferred polyvinyl chloride composition, the temperature of the composition is preferably raised to about 240° F. to about 275° F. Generally, the oven temperature would be slightly higher temperature to have the coating reach the desired temperature. After gelling the first coat, the product is cooled in the event it is desired to print a design on the surface of the gelled coating. The design can be printed by any of the conventional printing methods, with the rotogravure printing technique being particularly suitable. The printing composition can be one of the conventional printing inks or similar compositions which will adhere to the gelled coating.

After the printing step, or after the first coating operation, if subsequent printing is to be omitted, the composition is passed through an oven. The heat supplied in this operation should be sufficient to completely gel the composition and decompose the blowing agent. The temperature of the entire mass of composition upon the backing must attain the fusion temperature of the resin in order that a product of satisfactory strength is to be attained. Using the preferred vinyl resin, fusion is attained at a temperature of about 300° F. to about 375° F. In addition, the entire mass of foamable composition must be heated to a point where the blowing agent is decomposed. When the high temperature blowing agent is used, foaming does not occur until the resinous composition has been completely fused.

Heating, in order to effect fusion and foaming, can be brought about in a forced hot air oven or other types of heating can be used. For example, the product can be passed beneath radiant heating elements; alternately, dielectric heating can be used.

COOLING

The foamed and fused product, after leaving the heating operation, is permitted to cool. Cooling is particularly important since any premature handling of the product immediately after foaming might cause partial distortion of the foam structure. Cooling can be brought about by mere exposure of the product to the atmosphere; thus, the speed of motion of the backing along the processing apparatus and the spacing between the fusion oven and the next operation can be adjusted so the product is given sufficient time to cool. Alternately, cooling can be accelerated by blowing jets of cooled air upon the fused and foamed composition or by means of fine sprays of water upon the fused and foamed composition or by utilizing cooling rolls. The cooling is either selective or total. As indicated above, the upper and lower surfaces of the foam layer can be cooled so that only the center of the product remains heated. This center portion is thus the subsequently densified portion of the foam layer. If it is desired to densify one or both surfaces of the foam layer, it is preferable to first cool the product and then reheat the surface or surfaces to be densified. As is apparent, the temperature of the particular section of the sheet to be densified will determine to a large extent the degree of densification. As a general rule, the section of the sheet to be densified should have a temperature of at least 150° F. and preferably over 200° F. The maximum temperature would be the decomposition temperature of the resin but, as a general rule, a temperature of about 375° F. is the maximum which should be utilized.

DENSIFYING

The densifying is carried out by utilizing a hard surface roll such as a steel or chrome-plated roll and a back-up roll such as a rubber-covered roll. The steel roll can be cold or heated, depending on the condition desired. The hard-surface roll is preferably maintained at a temperature about 100° F. less than the fusion temperature of the resinous composition. Utilizing the preferred vinyl resins, the temperature of the hard-surface roll would be about 100° F. to about 275° F. This temperature differential is usually necessary to prevent the composition from sticking to the roll. The density in the final foam will depend on the spacing of the rolls as compared to the thickness of the foam layer. The density of the foam can be varied by controlling the temperature of the foam layer and the rolls. As an illustration, a gauge reduction of 20 percent in the foam layer will result in about a four-fold increase in density in the heated section of the foam if the thickness of the heated area of foam is about 20 percent of the thickness of the foam layer. The spacing between the rolls will not correspond directly with the gauge reduction in the foam layer since the unheated portion of the foam layer will be compressed and then will recover. Rather unusual design effects can be obtained if the heating of the layer is limited to spaced-apart points.

As indicated above, a particularly decorative effect can be obtained by engraving one of the rolls with a design. In addition, particularly attractive patterns can be obtained by at least partially filling the embossing with a composition of contrasting coloration. The latter can be accomplished by the valley printing technique or by spanishing a coating on the embossed surface.

After densifying, the product is cooled and then withdrawn from the processing apparatus. It can be used in the form of a sheet as produced or can be cut into tiles or other appropriate shapes, depending on the particular use to which the product is to be put. Products produced in accordance with the invention have the characteristics of a high density. The products of the invention have good heat insulating properties by virtue of the layer of foamed composition and thus are warmer in winter and cooler in summer than conventional surface coverings. They can be produced in a large range of decorative designs. The products have a smooth, dense layer of resin at the surface or inner face which gives them excellent wear resistance and/or tensile strength. The products of the invention not only make excellent surface coverings but have a wide range of additional uses. As an illustration, the products can be utilized as a textile material in making clothing having the appearance and hand of suede by embossing the surface of the sheet with a leather simulated design.

The following examples are given for purposes of illustration:

Example I

The following ingredients in the proportions indicated were ground on a three-roll mill:

| | Parts |
|---|---|
| Polyvinyl chloride (dispersion grade) | 100 |
| Petroleum hydrocarbon condensate [1] | 18 |
| Butyl benzyl phthalate | 52 |
| Finely divided filler | 3 |
| Stabilizers | 4 |
| Azodicarbonamide blowing agent | 3.5 |

[1] Conoco 300—Continental Oil Co., Ponca City, Oklahoma.

The plastisol had a viscosity of 4,000 centipoises as measured with a Brookfield viscometer using a No. 6 spindle at 10 r.p.m.

Example II

The following ingredients were ground on a three-roll mill:

| | Parts |
|---|---|
| Polyvinyl chloride (dispersion grade) | 100 |
| Petroleum hydrocarbon condensate | 18 |
| Butyl benzyl phthalate | 52 |
| Finely divided filler | 3 |
| Stabilizers | 4 |
| Azodicarbonamide blowing agent | 1 |
| V.M. and P. naphtha, boiling range 190 to 275° F. | 5 |

The plastisol had a viscosity of 2,000 centipoises as measured with a Brookfield viscometer using a No. 6 spindle at 10 r.p.m. It was suitable for printing by the flat bed method.

Example III

A foamable composition is prepared having the following composition:

| | Parts |
|---|---|
| Polyvinyl chloride (particle size averaging less than 5 microns) | 717.50 |
| Tricresyl phosphate | 179.41 |
| Paraplex G–62 (epoxidized soya bean oil) | 358.75 |
| MPS–500 (chlorinated fatty acid ester) | 179.41 |
| Thermalite (thio-organo-tin compound) | 8.4 |
| BL–425 (sodium alkyl sulfonate in DOP) | 45.15 |
| Azodicarbonamide (70% in mineral oil) | 156.15 |

Example IV

A foamable composition is prepared having the following composition:

| | Parts |
|---|---|
| Polyvinyl chloride | 100 |
| Aromatic hydrocarbon resin | 38 |
| Polyester type plasticizer | 38 |
| Tricresyl phosphate | 24 |
| Tribasic lead sulfate | 2.5 |
| Azodicarbonamide | 15 |
| Sodium alkyl sulfonate in DOP | 7 |

Example V

A foamable composition is prepared having the following composition:

| | Parts |
|---|---|
| Polyvinyl chloride | 100 |
| Dioctyl phthalate | 30 |
| Polyester type plasticizer | 45 |
| Dibasic lead sulfate | 2 |
| Azodicarbonamide | 13 |
| Sodium alkyl sulfonate in DOP | 7 |
| Mica | 20 |

Example VI

As foamable composition is prepared having the following composition:

| | Parts |
|---|---|
| Polyvinyl chloride (dispersion grade) | 100 |
| Butyl benzyl phthalate | 60 |
| Alkyl aryl hydrocarbon | 5 |
| Dibasic lead phosphite | 1 |
| Titanium dioxide | 2 |

Example VII

A foamable plastisol is formulated by grinding the following ingredients on a conventional Cowles mixer:

| | Parts |
|---|---|
| Vinyl chloride-vinyl acetate copolymer (dispersion grade) | 100 |
| Dioctyl phthalate | 60 |
| Alkyl aryl hydrocarbon | 5 |
| Dibasic lead phosphite | 1 |
| Finely divided titanium dioxide | 2 |
| Azodicarbonamide | 4 |

The plastisol has a viscosity of 2,500 centipoises at 25° C. as measured with a Brookfield viscometer using a No. 6 spindle at 10 r.p.m. The plastisol is applied as a uniform coating of 0.014 inch on the surface of a release paper having a coating of a complex compound of the Werner type in which a trivalent nuclear chromium atom is coordinated with an acyclic carboxylic acido group having at least 10 carbon atoms. Such a composition is disclosed in United States Patent 2,273,040, issued February 17, 1942. The plastisol coating is then heated to a temperature of 400° F. for a period of 2½ minutes to fuse the composition and completely decompose the blowing agent to form a foam layer of about 0.080 inch in thickness. The fused and foamed coating is then cooled to 100° F. and the upper surface of the foam layer is heated to 350° F. to a depth of 0.010 inch. The heated foam layer is passed through a pair of rotating rolls. The rolls rotate at approximately the same peripheral speed as the sheet. The roll contacting the surface is a steel roll heated to a temperature of 150° F. The roll contacting the back of the sheet is a rubber-covered steel roll maintained at a temperature of about 100° F. The rolls are spaced about a distance of 0.050 inch which causes the complete collapse of the heated portion of the foam layer. The result is a foam product having a foam layer of 0.070 inch in thickness and a densified layer of 0.002 inch in thickness on its surface having a density of about ten times that of the foam. The product makes an excellent surface covering having good wear resistance.

Any departure from the foregoing description which conforms to the present invention is intended to be included within the scope of the claims.

I claim:

1. A process for producing a sheet of cellular resinous composition foam containing a continuous portion of non-cellular resinous composition of substantial thickness as an integral part of the sheet which comprises applying a coating of a foamable resinous composition containing a blowing agent on one surface of a base, heating the foamable composition to completely expand and fuse the resinous composition and decompose the blowing agent thereby forming a continuous sheet of cellular foam structure, cooling a continuous portion of said continuous foam sheet to set said cellular foam structure in the cooled portion without substantially lowering the temperature of the remaining part of the foam sheet, passing the foam layer between the nip of two rolls spaced apart a distance substantially less than the thickness of the foam layer thereby collapsing the cellular structure of the remaining heated part of the foam sheet to form a non-cellular portion without collapsing the cellular structure of said cooled layer and thereafter cooling the entire product thus formed.

2. The process of claim 1 wherein said foamable composition is a vinyl chloride polymer composition.

3. The process of claim 1 wherein said foamable resinous composition is a plastisol of a vinyl chloride polymer.

4. The process of claim 1 wherein said base is a felt sheet impregnated with a waterproofing and strengthening impregnant.

5. The process of claim 3 wherein said base sheet is felted fibrous sheet of cellulosic fibers.

6. The process of claim 1 wherein the roll contacting the surface of the foam layer is maintained at a temperature of about 100° F. to about 275° F.

7. The process of claim 1 wherein said coating is applied to said base by printing a series of individually pigmented foamable resinous compositions.

8. The process of claim 1 wherein prior to fusing and foaming the composition, the layer is heated to at least partially fuse the resin and a design is printed on the surface of the partially fused resinous layer.

9. A process for producing a sheet of cellular resinous composition foam having a continuous upper surface of non-cellular resinous composition of substantial thickness which comprises applying a uniform coating of a foamable resinous composition containing a blowing agent on one surface of a base sheet, heating the foamable composition to completely expand and fuse the composition and decompose the blowing agent thereby producing a sheet of uniform thickness having a foam cellular structure, cooling the entire foam layer, heating the upper surface of the foam layer without substantially raising the temperature of the lower portion of the foam layer, passing the foam layer between the nip of two rolls spaced apart a distance substantially less than the thickness of the foam layer thereby collapsing the cellular foam structure in the heated portion of the foam layer to form a non-cellular layer of uniform thickness and thereafter cooling the entire product thus produced.

10. The process of claim 9 wherein said foamable composition is a vinyl chloride polymer composition.

11. A process for producing a sheet of cellular resinous composition foam having outer layers of non-cellular resinous composition of substantial thickness which comprises applying a uniform coating of a foamable resinous composition containing a blowing agent on one surface of a base sheet, heating the foamable composition to completely expand and fuse the composition and decompose the blowing agent thereby producing a sheet of uniform thickness having a cellular foam structure, cooling the entire foam sheet, stripping the foam sheet from the base sheet, heating both outer surfaces of the foam sheet without substantially raising the temperature of the major portion of the interior of the foam sheet, passing the foam sheet between the nip of two rotating rolls spaced apart a distance substantially less than the thickness of the foam sheet thereby collapsing the cellular foam structure in the heated area of the sheet and thereafter cooling the entire product thus produced.

12. The process of claim 11 wherein said foamable composition is a vinyl chloride polymer composition.

13. A process for producing a sheet of cellular resinous composition foam having an interlayer of substantial thickness of non-cellular resinous composition which comprises applying a uniform coating of a foamable resinous composition containing a blowing agent on one surface of a base sheet, heating the foamable composition to completely expand and fuse the composition and decompose the blowing agent thereby producing a cellular foam sheet of uniform thickness, cooling both outer surfaces of the foam sheet without substantially lowering the temperature of a substantial portion of the interior of the foam sheet, passing the foam sheet between the nip of two rotating rolls spaced apart a distance substantially less than the thickness of the foam sheet thereby collapsing the cellular foam structure in the heated interior portion of the foam sheet and thereafter cooling the entire product thus produced.

14. The process of claim 13 wherein said foamable composition is a vinyl chloride polymer composition.

References Cited by the Examiner

UNITED STATES PATENTS

| | | | |
|---|---|---|---|
| 2,008,718 | 7/35 | Jenkins | 156—77 X |
| 2,533,985 | 12/50 | Aronstein | 156—247 |
| 2,817,597 | 12/57 | Alderfer | 156—78 |
| 2,866,730 | 12/58 | Potchen. | |
| 2,878,153 | 3/59 | Hacklander. | |
| 2,893,877 | 7/59 | Nickolls. | |
| 2,950,221 | 8/60 | Bauer | 156—78 X |
| 2,961,332 | 11/60 | Nairn. | |
| 2,962,406 | 11/60 | Rosa. | |
| 2,964,799 | 12/60 | Roggi. | |
| 2,994,110 | 8/61 | Hardy. | |
| 3,007,205 | 11/61 | House | 156—78 |
| 3,042,972 | 7/62 | Lafferty | 18—48 |
| 3,076,234 | 2/63 | Paulus | 156—247 |
| 3,104,192 | 9/63 | Hacklander. | |

EARL M. BERGERT, *Primary Examiner.*